US012739641B2

(12) United States Patent
Turtinen et al.

(10) Patent No.: US 12,739,641 B2
(45) Date of Patent: Sep. 15, 2026

(54) ATTACKER IDENTIFICATION DURING SMALL DATA TRANSMISSION

(71) Applicant: Nokia Technologies Oy, Espoo (FI)

(72) Inventors: Samuli Heikki Turtinen, Oulu (FI); Jussi-Pekka Koskinen, Oulu (FI); Chunli Wu, Beijing (CN)

(73) Assignee: Nokia Technologies Oy, Espoo (FI)

(*) Notice: Subject to any disclaimer, the term of this patent is extended or adjusted under 35 U.S.C. 154(b) by 269 days.

(21) Appl. No.: 18/399,193

(22) Filed: Dec. 28, 2023

(65) Prior Publication Data

US 2024/0259807 A1 Aug. 1, 2024

(30) Foreign Application Priority Data

Jan. 26, 2023 (WO) ................ PCT/CN2023/073479

(51) Int. Cl.

*H04W 76/27* (2018.01)
*H04W 12/108* (2021.01)
*H04W 12/121* (2021.01)

(52) U.S. Cl.

CPC ....... *H04W 12/108* (2021.01); *H04W 12/121* (2021.01); *H04W 76/27* (2018.02)

(58) Field of Classification Search

CPC . H04W 12/108; H04W 12/121; H04W 12/10; H04W 12/122; H04W 12/106; H04W 76/27; H04W 24/10

See application file for complete search history.

(56) References Cited

U.S. PATENT DOCUMENTS

| | | | | |
|---|---|---|---|---|
| 2020/0288319 | A1 | 9/2020 | Pham Van et al. | |
| 2021/0274525 | A1* | 9/2021 | Wei | H04W 76/27 |
| 2022/0007423 | A1* | 1/2022 | Agiwal | H04W 76/27 |
| 2022/0046421 | A1 | 2/2022 | Shrestha et al. | |
| 2022/0322482 | A1* | 10/2022 | Xu | H04W 76/27 |
| 2022/0361239 | A1* | 11/2022 | Xu | H04W 76/27 |
| 2022/0361278 | A1* | 11/2022 | Tsai | H04W 72/21 |
| 2022/0408403 | A1* | 12/2022 | Tseng | H04W 76/27 |

(Continued)

FOREIGN PATENT DOCUMENTS

| | | | |
|---|---|---|---|
| WO | 2021/098106 | A1 | 5/2021 |
| WO | 2021/207467 | A1 | 10/2021 |

(Continued)

OTHER PUBLICATIONS

Office action received for corresponding European Patent Application No. 24151265.6, dated Jul. 30, 2025, 7 pages.

(Continued)

*Primary Examiner* — Lynn D Feild
*Assistant Examiner* — Abdullah Almamun
(74) *Attorney, Agent, or Firm* — McCarter & English, LLP

(57) ABSTRACT

According to an aspect, there is provided a terminal device for performing the following. The terminal device obtains, when the terminal device is in an inactive state while a small data transmission, SDT, procedure is ongoing, information that indicates transmission of a data unit over a radio bearer to the terminal device. The terminal device checks whether or not the radio bearer is configured for the SDT procedure. The terminal device determines whether or not to avoid further processing and/or decoding of the data unit based at least on the checking.

18 Claims, 7 Drawing Sheets

(56) References Cited

U.S. PATENT DOCUMENTS

| | | | | |
|---|---|---|---|---|
| 2022/0408495 | A1 | 12/2022 | Agiwal et al. | |
| 2022/0416990 | A1 | 12/2022 | Tsai et al. | |
| 2023/0102755 | A1* | 3/2023 | Xu | H04W 8/02 370/329 |
| 2023/0189245 | A1* | 6/2023 | Alfarhan | H04L 1/1854 370/329 |
| 2023/0189380 | A1* | 6/2023 | Palat | H04W 76/11 370/329 |
| 2024/0098833 | A1* | 3/2024 | Tseng | H04W 48/12 |
| 2024/0163960 | A1* | 5/2024 | Wang | H04W 12/03 |
| 2024/0188177 | A1* | 6/2024 | Yue | H04W 74/08 |
| 2024/0306147 | A1* | 9/2024 | Wang | H04W 76/27 |
| 2025/0081280 | A1* | 3/2025 | Wu | H04W 76/27 |
| 2025/0089119 | A1* | 3/2025 | Wu | H04W 76/27 |
| 2025/0176061 | A1* | 5/2025 | Wu | H04W 76/30 |

FOREIGN PATENT DOCUMENTS

| | | | |
|---|---|---|---|
| WO | 2022/075782 | A1 | 4/2022 |
| WO | 2022/083905 | A1 | 4/2022 |
| WO | 2022/151057 | A1 | 7/2022 |
| WO | 2022/197844 | A1 | 9/2022 |
| WO | 2022/205186 | A1 | 10/2022 |
| WO | 2022/266848 | A1 | 12/2022 |

OTHER PUBLICATIONS

Examiner's Tentative Rejection received for corresponding Taiwan Patent Application No. 113102036, dated Sep. 5, 2024, 23 pages of office action and 5 pages of office action translation available.

"Introduction of SDT", 3GPP TSG-RAN WG2 Meeting #117 Electronic, R2-2204234, Nokia, Feb. 21-Mar. 3, 2022, 28 pages.

Extended European Search Report received for corresponding European Patent Application No. 24151265.6, dated May 28, 2024, 12 pages.

"Running MAC CR for Small Data", 3GPP TSG-RAN2 Meeting #114e, R2-2105031, Huawei, May 19-25, 2021, 162 pages.

"LS to CT1 on Small Data Transmission", 3GPP TSG-CT WG1 Meeting #136-e, C1-223315, RAN2, May 12-20, 2022, pp. 1-2.

"New WI: Mobile Terminated-Small Data Transmission (MT-SDT) for NR", 3GPP TSG RAN Meeting #94e, RP-213583, Agenda: 8.6.2, ZTE Corporation, Dec. 6-17, 2021, 5 pages.

"3rd Generation Partnership Project; Technical Specification Group Radio Access Network; NR; NR and NG-RAN Overall Description; Stage 2 (Release 17)", 3GPP TS 38.300, V17.2.0, Sep. 2022, pp. 1-210.

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

"3rd Generation Partnership Project; Technical Specification Group Radio Access Network; NR; Medium Access Control (MAC) protocol specification (Release 17)", 3GPP TS 38.321, V17.2.0, Sep. 2022, pp. 1-246.

"3rd Generation Partnership Project; Technical Specification Group Services and System Aspects; Study on security aspects of Machine-Type Communications (MTC) and other mobile data applications communications enhancements (Release 12)", 3GPP TR 33.868, V12.1.0, Jun. 2014, pp. 1-116.

"Consideration on CP issues for small data transmission", 3GPP TSG-RAN WG2 Meeting #113bis electronic, R2-2103405, Agenda: 8.6.3, Lenovo, Dec. 12-20, 2021, pp. 1-6.

International Search Report and Written Opinion received for corresponding Patent Cooperation Treaty Application No. PCT/CN2023/073479, dated Oct. 7, 2023, 8 pages.

"Initial considering on MT-SDT", OPPO, 3GPP-TS-RAN WG2 Meeting #120, R2-2211867, Nov. 2022, 7 pages.

"UP aspects for SDT", Nokia, Nokia Shanghai Bell, 3GPP TSG-RAN WG2 Meeting #116bis Electronic, R2-2201586, Jan. 2022, 5 pages.

"Small data transmission failure timer", InterDigital, Asia Pacific Telecom, Ericsson, ETRI, FGI, Sharp, Sony, 3GPP RSN WG2 Meeting #113e, R2-2101578, Jan.-Feb. 2021, 4 pages.

JP Office Action dated Jun. 11, 2026, JP Application No. 2025-543281, 11 pages.

* cited by examiner

201: Obtain, when terminal device is in inactive state during SDT operation, information that indicates data communication over radio bearer to terminal device 202: Check whether or not radio bearer is configured for SDT procedure 203: Determine whether or not to avoid further processing and/or decoding of data communication based at least on checking 401: Suspend all data communications to terminal device over any radio bearer not configured for SDT procedure when terminal device is in inactive state while SDT procedure involving terminal device is ongoing 601: Suspend all data communications to terminal device over any radio bearer not configured for SDT procedure when terminal device is in inactive state while SDT procedure involving terminal device is ongoing with exceptions of SRB1 and/or integrity protected radio bearers 602: Transmit, to terminal device when terminal device is in inactive state while SDT procedure is ongoing, data communication over SRB1 not configured for SDT procedure or integrity protected radio bearer not configured for SDT procedure

Fig. 6

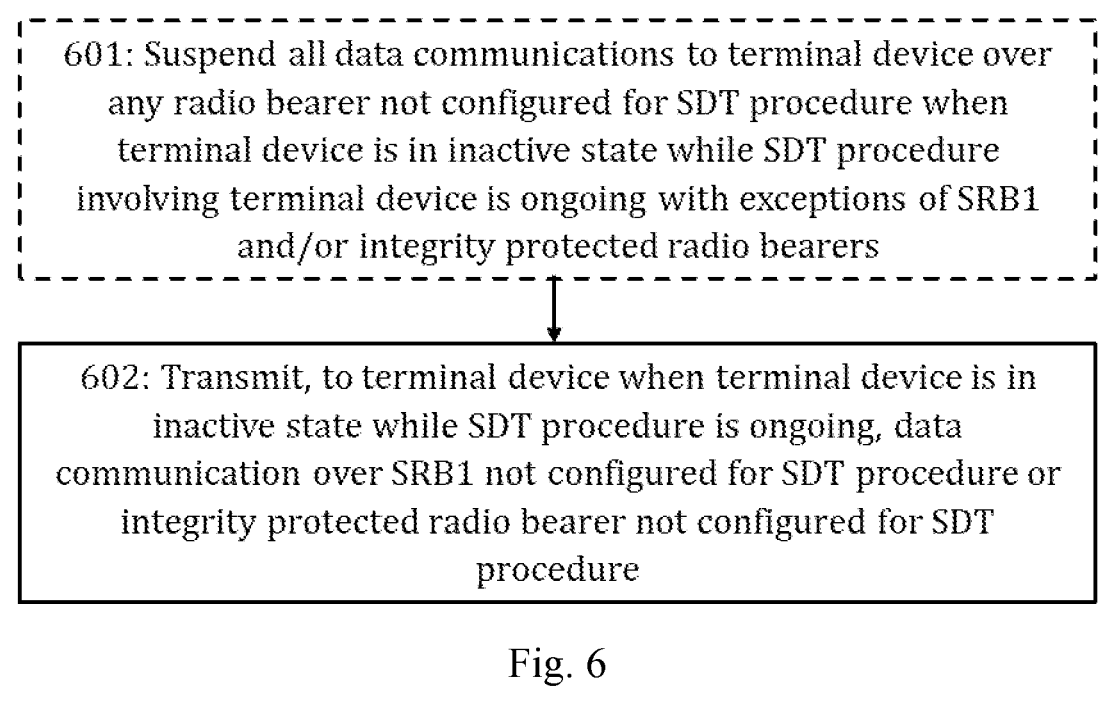

ATTACKER IDENTIFICATION DURING SMALL DATA TRANSMISSION

CROSS-REFERENCE TO RELATED APPLICATION

This application claims priority from, and the benefit of, PCT Application No. PCT/CN2023/073479, filed on 26 Jan. 2023, which is incorporated herein by reference in its entirety.

TECHNICAL FIELD

Various example embodiments relate to wireless communications.

BACKGROUND

Small Data Transmission (SDT) is a procedure allowing data and/or signaling transmission by a terminal device while remaining in an inactive state, that is, without transitioning to a connected state. SDT is enabled on a radio bearer basis. SDT may be initiated by the terminal device, for example, if less than a configured amount of uplink data awaits transmission across all radio bearers for which SDT is enabled, the downlink reference signal received power (DL RSRP) is above a pre-defined threshold, and a valid SDT resource is available. When a given terminal device is carried out an SDT procedure, the terminal device is vulnerable to transmissions of "garbage" data on any (data) radio bearer by malicious attacker network nodes. Thus, improvements for data handling and security in connection with SDT are needed.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which FIG. 1 illustrates an exemplified wireless communication system;

FIGS. 2 to 8 illustrate exemplary processes according to embodiments;

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Embodiments and examples described herein may be implemented in any communications system comprising wireless connection(s). In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, substantially the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figures 1, 2:
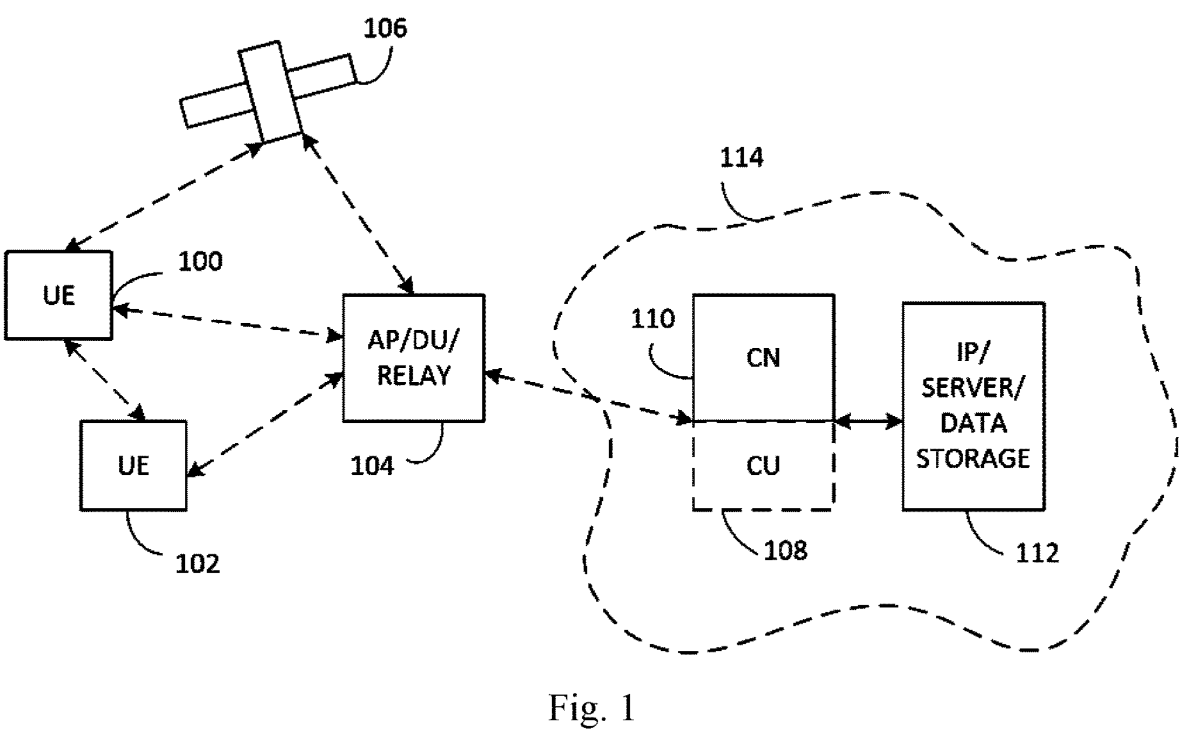

FIG. 1 depicts examples of simplified system architectures showing some elements and functional entities, some or all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The core network 110 may comprise a Location Management Function (LMF) and/or some other network node for performing position estimation of terminal devices. The LMF may be configured to receive measurements and assistance information from the next generation radio access network (NG-RAN) and the terminal devices 100, 102 via the access and mobility management function (AMF) of the core network 110 over the NLs interface between the AMF and LMF for calculating the position of the terminal devices 100, 102.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink device, of which an example is a camera or video camera loading images or video clips to a network. A user device may also be a device having capability to operate in Internet of Things (IoT) network which is a scenario in which objects are provided with the ability to transfer data over a network without needing human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the substantially same infrastructure to run services that have different needs on latency, reliability, throughput and mobility.

The current architecture in LTE networks is fully distributed in the radio and fully centralized in the core network. The low latency applications and services in 5G need to bring the content close to the radio which leads to local break out and multi-access edge computing (MEC). 5G enables analytics and knowledge generation to occur at the source of the data. This approach needs leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are needed to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

The terminal devices 100, 102 and the network node 104 may be configured to support small data transmission (SDT) for allowing data communication while the terminal device 100, 102 is operating in an inactive state (e.g., a Radio Resource Control, RRC, inactive state). More specifically, the terminal devices 100, 102 and the network node 104 may be configured to support mobile originated SDT (MO-SDT) or mobile terminated SDT (MT-SDT). MO-SDT enables small data transmissions in uplink direction when the terminal device operating in an inactive state while MT-SDT enables small data transmissions in both uplink and downlink directions when the terminal device operating in an inactive state (though the initial triggering transmission in MT-SDT is in downlink direction). As described above, SDT may be enabled on a radio bearer basis, and/or it may be initiated by a terminal device 100, 102, e.g., if less than a configured amount of uplink data awaits transmission across all radio bearers for which SDT is enabled, the DL RSRP is above a pre-defined threshold, and a valid SDT resource is available to the terminal device 100, 102.

When a given terminal device 100, 102 initiates MO-SDT or when MT-SDT is indicated by a network node 104 (e.g., an access node or a distributed unit of a distributed access node) to the terminal device 100, 102, the terminal device 100, 102 is vulnerable to transmissions of garbage downlink data on any radio bearer by a malicious attacker access node (or "a man in the middle", MITM). These radio bearers may comprise also radio bearers not configured for the SDT procedure since the terminal device may be served to transmit/receive SDT data by means of a radio access (RA) procedure which the terminal device initiates over SDT specific physical random access channel (PRACH) resources. The terminal device 100, 102 has no means to discard the unwanted packets if it has the radio bearer configured but said radio bearer is not used for SDT. This may in turn, easily lead to filling up of the receiver data buffer of the terminal device 100, 102.

Due to the way that the SDT operates, a terminal device using SDT is vulnerable to attackers since the terminal device identifies the genuine network based on an RRC message that terminates the SDT procedure (e.g., a RRCRelease, RRCResume or RRCSetup message). Hence, the terminal device would be able to determine that it received/transmitted data to an attacker network node only after the end of the SDT procedure. In the worst case (attacker network node letting the SDT timer T319a to expire), the terminal device cannot identify an attacker at all while it could be served by it for at most 4 seconds (maximum timer configuration for the SDT timer T319a). The data transmitted by the attacker network can reach the buffer of the terminal device, e.g., at media access control (MAC) layer where the terminal device is only able to identify that it received a data block (e.g., MAC service data unit) for a non-SDT radio bearer (i.e., a radio bearer not configured for the SDT procedure).

The embodiments to be discussed below seek to overcome or at least alleviate the problems described above by configuring the terminal device to detect (potentially) malicious transmissions and perform one or more actions (e.g., one or more security actions) accordingly to avoid (prolonged) reception of the malicious transmissions.

FIG. 2 illustrates a process according to embodiments for determining whether or not to avoid prolonged reception (and further processing and/or decoding) of unwanted data transmissions during the execution of an SDT procedure is necessary. The process in FIG. 2 may be performed by an apparatus (e.g., a computing device). Specifically, said apparatus may be a terminal device (e.g., either of terminal devices 100, 102 of FIG. 1) or a part thereof or an apparatus communicatively connected to a terminal device. In the following, the entity carrying out the process is called a terminal device for simplicity.

Referring to FIG. 2, it is initially assumed that the terminal device is operating in an inactive state. The inactive state may be the RRC inactive state (or equally an RRC_INACTIVE state).

Moreover, it is also initially assumed that an SDT procedure (e.g., an MO-SDT procedure and/or an MT-SDT procedure) is ongoing. For example, the terminal device may be executing the SDT procedure in communication with a network node. One or more (data) radio bearers may be configured for use by the terminal device for the SDT procedure. Also, one or more further radio bearers may be configured for the terminal device but not for use by the terminal device for the SDT procedure. The SDT procedure may involve transmission of (small) data from the terminal device (e.g., in uplink) and/or to the terminal devices (e.g., in downlink). The SDT procedure may employ one or more configured grant (CG) resources and/or one or more random access channel (RACH) resources for scheduling said transmissions.

The SDT procedure may have been initiated by the terminal device, e.g., in response to less than a configured amount of uplink data awaiting transmission across all radio bearers for which SDT is enabled/configured, the downlink RSRP being above a pre-defined threshold, and a valid SDT resource being available. The SDT procedure may have been initiated with either a transmission over RACH resources (which may have been configured via system information) or over type 1 CG resources (configured via dedicated signaling in RRCRelease message). The SDT resources may have been configured on initial bandwidth part (BWP) for RACH and/or CG. RACH and CG resources for SDT may have been configured on either or both of normal uplink (NUL) and supplementary uplink (SUL) carriers. The CG resources for the SDT procedure may be valid only within the primary cell (PCell) of the terminal device when the RRCRelease message with suspend indication is received. CG resources may be associated with one or multiple synchronization signal block(s) (SSB(s)). For RACH, the network may configure 2-step and/or 4-step RA resources for SDT. When both 2-step and 4-step RA resources for SDT are configured, the terminal device may be able to select the RA type used.

The terminal device obtains, in block 201, when the terminal device is in the inactive state while the SDT procedure is ongoing, information that indicates data communication (e.g., transmission of a data unit) to the terminal device over a radio bearer. The radio bearer may be a data radio bearer (DRB) or a signaling radio bearer (SRB). The data communication may comprise, for example, a data block, a data unit, a medium access control (MAC) protocol data unit (PDU), a MAC sub-PDU and/or a MAC service data unit (MAC SDU).

In some embodiments, the data communication may be a downlink data communication.

In some embodiments, the obtaining of the information in block 201 may comprise (or consist of) receiving the information from a network node. The network node may be, e.g., an access node, a distributed unit of a distributed access node or a relay node. In some cases, the network node may be, in particular, a malicious attacker network node transmitting on purpose "garbage" data.

In some embodiments, the obtaining of the information in block 201 may comprise (or consist of) obtaining the information from lower layers.

In some embodiments, the obtaining of the information in block 201 may comprise (or consist of) obtaining a MAC PDU, a MAC subPDU (comprising or consisting of a MAC subheader and a MAC SDU) or just a MAC subheader.

In some embodiments, the information that indicates the data communication may comprise or be a logical channel identifier (LCID) or an extended LCID (eLCID). Said LCID or eLCID may be associated with the radio bearer. The LCID (or equally the LCID field or value or index) identifies a logical channel instance of a corresponding MAC SDU or the type of the corresponding MAC control element (MAC CE) or padding. The LCID has the size of 6 bits. The eLCID is an extended version of the LCID having the size of 1 or 2 bytes depending on the value of the associated LCID.

In some embodiments, the terminal device may obtain (or receive from the network node), in block 201, also the data communication (e.g., a data block such as a MAC PDU and/or a MAC SDU and/or a MAC sub-PDU) itself.

In some embodiments, the data communication may comprise or be a MAC service data unit (MAC SDU). The MAC SDU may be comprised in a MAC sub-PDU of a transmitted MAC PDU. Additionally or alternatively, the information that indicates the data communication may comprise or be a header of the MAC sub-PDU or a part of the header of the MAC sub-PDU.

The terminal device checks, in block 202, whether or not the radio bearer (defined by with the obtained information) is configured for the SDT procedure. The checking in block 202 may be performed based on the information obtained in block 201. For example, the terminal device may check whether or not the radio bearer is configured for the SDT procedure based on the LCID provided in the MAC subheader. Alternatively, for example, the terminal device may determine one or more LCIDs associated with radio bearer (s) configured for the SDT procedure and may check if the obtained LCID value is one of the one or more LCIDs. These examples may apply equally for eLCIDs.

The terminal device determines, in block 203, whether or not to avoid further processing and/or decoding of the data communication based at least on the checking (or results of the checking). In some embodiments, the determining in block 203 may also be based on whether or not the radio bearer not configured for the SDT procedure satisfies at least one of one or more pre-defined criteria, as will be described below in connection with FIG. 5.

Figures 3, 4:
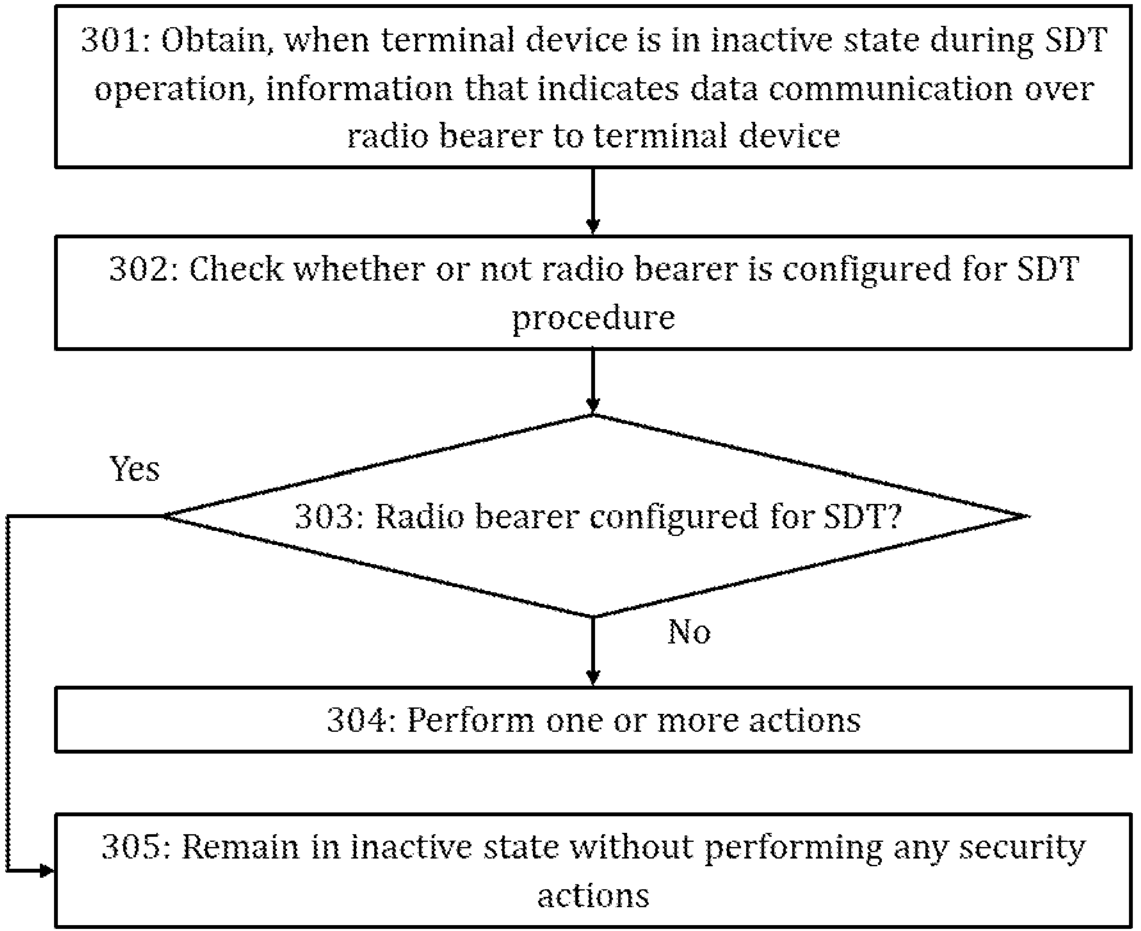

FIG. 3 illustrates a process according to embodiments for avoiding prolonged processing and/or decoding of unwanted data transmissions during the execution of an SDT procedure. The process in FIG. 3 may be performed by an apparatus (e.g., a computing device). Specifically, said apparatus may be a terminal device (e.g., either of terminal devices 100, 102 of FIG. 1) or a part thereof or an apparatus communicatively connected to a terminal device. In the following, the entity carrying out the process is called a terminal device for simplicity.

Referring to FIG. 3, it is initially assumed, similar to as discussed with FIG. 2, that the terminal device is operating in an inactive state (e.g., the RRC inactive state) and that an SDT procedure (e.g., an MO-SDT procedure and/or an MT-SDT procedure) is ongoing. For example, the terminal device may be executing the SDT procedure in communication with a network node. One or more radio bearers may be configured for use by the terminal device for the SDT procedure.

Similar to block 201 of FIG. 2, the terminal device obtains, in block 301, when the terminal device is in the inactive state while the SDT procedure is ongoing, information that indicates data communication (e.g., transmission of a data unit) to the terminal device over a radio bearer (and optionally also the data communication itself) and checks, in block 302, whether or not the radio bearer is configured for the SDT procedure. The description provided in connection with blocks 201, 202 of FIG. 2 may apply, mutatis mutandis, also for blocks 301, 302 of FIG. 3, respectively.

In response to the radio bearer being configured for the SDT procedure in block 303, the terminal device remains, in block 305, in the inactive state without performing any (security) actions (or specifically any of the actions described below in connection with block 304). The SDT procedure may also be continued in this case. Upon successful completion of the SDT procedure, the terminal device may transition from the inactive state to the idle state or to the connected state or remain in the inactive state.

In response to the radio bearer not being configured for the SDT procedure in block 303, the terminal device performs, in block 304, one or more actions for avoiding further processing and/or decoding of the data communication (or the data unit) associated with the radio bearer. Optionally, the one or more actions may also enable avoiding processing and/or decoding of any further data communications (e.g., data units) associated with the radio bearer while the SDT procedure is ongoing. The one or more actions may be security actions. The one or more actions may in general, enable avoiding (further) processing and/or decoding of any data associated with the radio bearer (i.e., any data received over the radio bearer) at least while the SDT procedure ongoing. Thus, in this case, the terminal device effectively assumes that the radio bearer may likely be associated with data transmissions by a malicious attacker network node and consequently prevents any (further) exposure to such harmful data transmissions.

In some embodiments where terminal device obtains in block 301 also the data communication (e.g., a data unit such as a MAC PDU and/or a MAC SDU and/or a MAC sub-PDU) itself, the one or more actions performed in block 304 may comprise at least one of:

- storing the data communication (or a part thereof) in a buffer;
- storing the data communication (or a part thereof) in the buffer and flushing the data communication stored in the buffer;
- discarding the data communication; or
- suspending sending of the data communication to upper layers.

In some embodiments, the one or more actions performed in block 304 may comprise discarding the data communication (e.g., a MAC sub-PDU) and/or indicating the reception of the data communication over the radio bearer not configured for the SDT procedure to upper layers (e.g., to RRC layer).

In some embodiments, the one or more actions performed in block 304 may comprise at least transitioning from the inactive state to an idle state (e.g., an RRC idle or RRC_IDLE state). For example, the terminal device may initiate actions upon going to the RRC_IDLE state.

In some embodiments, the transitioning to the (RRC) idle state may comprise or be accompanied by at least one (or all) of the following actions (in addition to the actual step of entering RRC_IDLE):

- reset MAC;
- set the variable pendingRNA-Update to false, if that is set to true;
- stop the timer T390 for all access categories if running and perform associated access barring alleviation steps;
- if stored, discard the cell reselection priority information provided by the cellReselectionPriorities;
- stop the timer T320, if running;
- stop all timers that are running except for timers T302, T320, T325, T330, T331 and T400;
- discard the UE Inactive access stratum (AS) context, if any;
- release the suspendConfig, if configured;
- remove all the entries within the MCG and the SCG VarConditionalReconfig, if any;
- for each measId, if the associated reportConfig has a reportType set to condTriggerConfig, remove entries associated with the measId (or the report Config) from VarMeasConfig;
- discard the KgNB key, the S-KgNB key, the S-KeNB key, the KRRCenc key, the KRRCint key, the KUPint key and the KUPenc key, if any;
- release all radio resources, including, e.g., release of the radio link control (RLC) entity, the backhaul adaption protocol (BAP) entity, the MAC configuration and the associated packet data convergence protocol (PDCP) entity and service data adaptation protocol (SDAP) for all established radio bearers (except for broadcast multicast radio bearers), backhaul (BH) RLC channels, Uu Relay RLC channels, PC5 Relay RLC channels and/or sidelink relay adaptation protocol (SRAP) entity;
- indicate the release of the RRC connection to upper layers together with the release cause;
- inform upper layers about the release of all application layer measurement configurations;
- discard any application layer measurement reports which were not yet submitted to lower layers for transmission;
- discard any segments of segmented RRC messages stored; or
- perform cell selection.

FIG. 4 illustrates a process according to embodiments for ensuring that no data is transmitted over non-SDT radio bearers while a terminal device is operating in an active state and an SDT procedure is ongoing. The process in FIG. 4 may be performed by an apparatus (e.g., a computing device). Specifically, said apparatus may be a network node or a part thereof or an apparatus communicatively connected to a network node. The network node may be an access node or a distributed unit of a distributed access node such as the element 104 of FIG. 1. In the following, the entity carrying out the process is called a network node for simplicity.

FIG. 4 illustrates a simplistic process with a single step. The process of FIG. 4 may be carried out substantially at the same time as the process of FIG. 2 or 3.

Referring to FIG. 4, it may be initially assumed that a terminal device has initiated an SDT procedure with the network node through SDT-specific resources (e.g., RACH resources). Alternatively, the SDT procedure may have been indicated to the network node via other means such as as a part of a resumeCause field in an (initial) uplink message from the terminal device to the network node.

The network node suspends, in block 401, all data communications (e.g., all transmissions of data blocks or data units) to a terminal device over any radio bearer not configured for an SDT procedure when the terminal device is in an inactive state while the SDT procedure involving the terminal device is ongoing. For example, it may be required (e.g., by a technical specification) the network node shall not perform any data communication (e.g., transmissions of data blocks or data units) to a terminal device over any radio bearer not configured for an SDT procedure when the terminal device is in an inactive state while the SDT procedure involving the terminal device is ongoing. Here, the SDT procedure may or may not involve the network node itself. By configuring all valid (or legitimate) network nodes in this manner, the terminal device may safely assume that if any data communication is received over a non-SDT radio bearer during the SDT procedure, said data communication originates from an attacker network node. It should be noted that, in some other embodiments, exceptions to this strict rule of not allowing any data communication over non-SDT radio bearers may be implemented, as will be described below.

Figure 5:
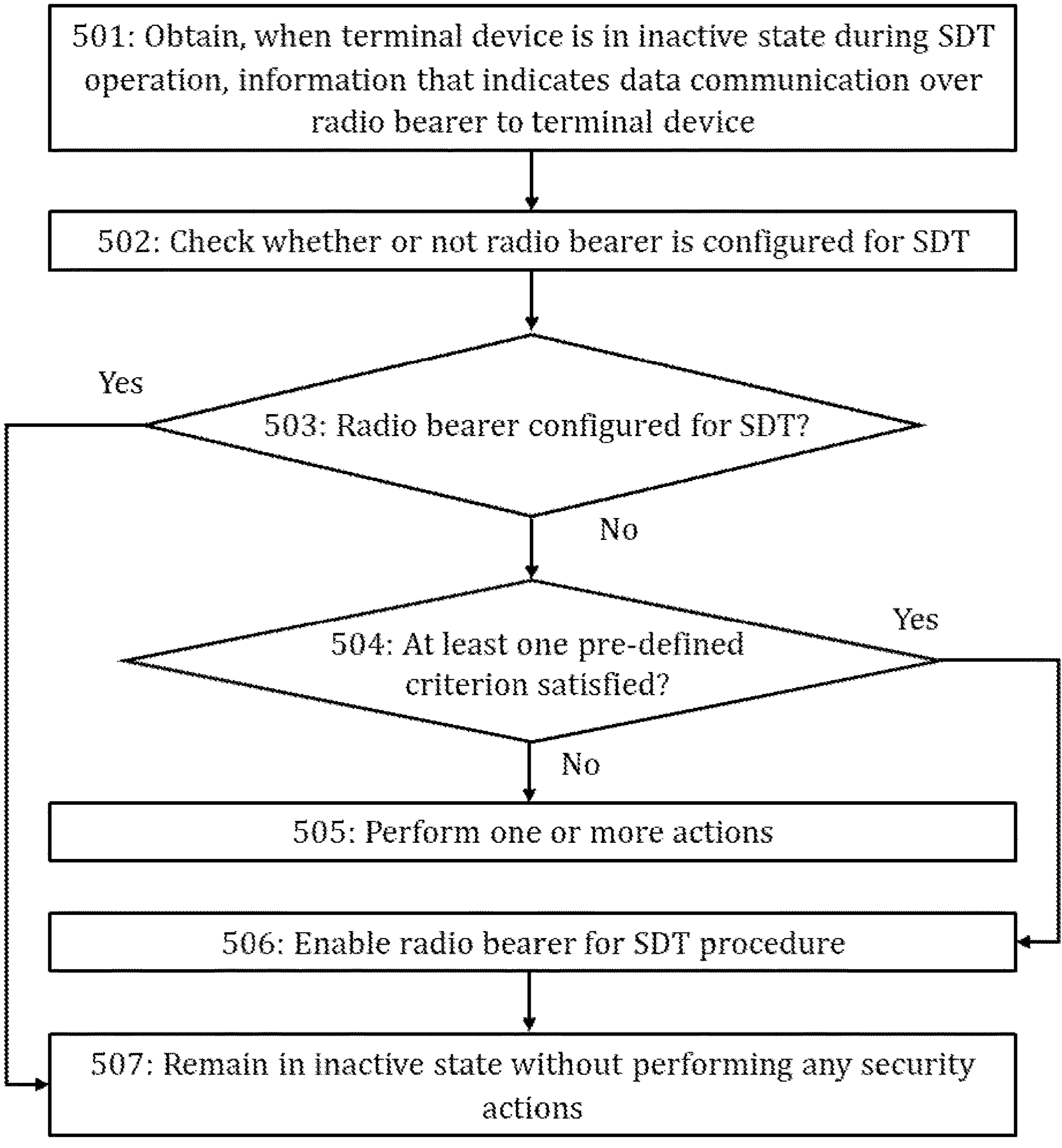

FIG. 5 illustrates another process according to embodiments for avoiding prolonged processing and/or decoding of unwanted data transmissions during the execution of an SDT procedure. The process in FIG. 5 may be performed by an apparatus (e.g., a computing device). Specifically, said apparatus may be a terminal device (e.g., either of terminal devices 100, 102 of FIG. 1) or a part thereof or an apparatus communicatively connected to a terminal device. In the following, the entity carrying out the process is called a terminal device for simplicity.

Referring to FIG. 5, it is initially assumed, similar to as discussed with FIGS. 2 and 3, that the terminal device is operating in an inactive state (e.g., the RRC inactive state) and that an SDT procedure (e.g., an MO-SDT procedure and/or an MT-SDT procedure) is ongoing. For example, the terminal device may be executing the SDT procedure in communication with a network node. One or more radio bearers may be configured for use by the terminal device for the SDT procedure.

Similar to block 201 of FIG. 2, the terminal device obtains, in block 501, when the terminal device is in the inactive state while the SDT procedure is ongoing, information that indicates data communication (e.g., transmission of a data unit) to the terminal device over a radio bearer (and optionally also the data communication itself) and checks, in block 502, whether or not the radio bearer is configured for the SDT procedure. The description provided in connection with blocks 201, 202 of FIG. 2 may apply, mutatis mutandis, also for blocks 501, 502 of FIG. 3, respectively.

In response to the radio bearer being configured for the SDT procedure in block 503, the terminal device remains, in block 507, in the inactive state without performing any actions for avoiding further processing and/or decoding of the data communication associated with the radio bearer, similar to block 304 of FIG. 3.

However, in response to the radio bearer not being configured for the SDT procedure in block 503, the terminal device does not directly proceed to performing the one or more actions for avoiding further processing and/or decoding of the data communication associated with the radio bearer, in contrast the process of FIG. 3. Instead, in this case, the terminal device checks, in block 504, whether or not the radio bearer satisfies at least one of one or more pre-defined criteria. The one or more pre-defined criteria may define one or more special cases in which said one or more actions (e.g., a transition from the inactive state to an idle state) do not have to be carried out even though the radio bearer is not for configured for the SDT procedure. The one or more pre-defined criteria may be maintained in at least one memory of the terminal device.

In some embodiments, the one or more pre-defined criteria may comprise at least a criterion requiring the radio bearer to be a signaling radio bearer 1 (SRB1). SRB1 is a signaling radio bearer (i.e., a radio bearer carrying at least one signaling message) for RRC messages (optionally including a piggybacked non-access stratum, NAS, message) as well as for NAS messages prior to the establishment of a signaling radio bearer 2 (SRB2). SRB1 employs downlink control channel (DCCH) logical channel. SRB1 has higher priority than SRB2. SRB1 is commonly used for transmitting signaling messages to a terminal device while an SDT procedure (involving that terminal device) is ongoing. It should, however, be emphasized that SRB1 is not (explicitly) configured for any SDT procedure as such.

In some embodiments, the one or more pre-defined criteria may comprise at least a criterion requiring the radio bearer to be a radio bearer configured with integrity protection (i.e., configured so as to ensure that the transmitted data is not corrupted or altered in any way). For example, PDCP associated with the radio bearer may be configured with integrity protection. Then, the terminal device (or specifically the PDCP entity thereof) may determine, in block 504, based on the received data communication whether or not the data communication passes the integrity check (i.e., whether or not the integrity protection check succeeds or fails). This alternative has the benefit of enabling initiation of the SDT procedure without configuring any SDT radio bearers beforehand.

In some embodiments where the obtaining in block 501 is assumed to comprise receiving the information from a network node (e.g., an access node or a distributed unit of a distributed access node), the one or more pre-defined criteria may comprise a criterion requiring the network node associated with the radio bearer not configured for the SDT procedure to be known by the terminal device to be a valid, non-fraudulent (i.e., genuine) network node (or that the associated network is known to be a valid, non-fraudulent network). The terminal device may in general, determine that a given network node is a valid, non-fraudulent (or genuine) network node, for example, based on a radio bearer used for a data communication from the network node during an SDT procedure being SRB1 or an integrity protected radio bearer. Thus, in reference to FIG. 5, if the terminal device has previously (i.e., during a previous execution of the process of FIG. 5) received a data bearer not configured for the SDT procedure but satisfying at least one of the one or more pre-defined criteria (namely being SRB1 or integrity protected) from the same network node, the network node may be assumed to be known by the terminal device to be a valid, non-fraudulent (i.e., genuine) network node (and thus the aforementioned criterion is satisfied). Therefore, the criteria defining that the radio bearer should be SRB1 or an integrity protected radio bearer needs to be satisfied only once. Thereafter, data communications over any radio bearers from the trusted network node may be transmitted successfully during the SDT procedure.

To keep track of the valid, non-fraudulent network nodes and/or networks, the terminal device may maintain a list of valid, non-fraudulent (or trusted) network nodes and/or networks in at least one memory of the terminal device. In response to determining that a given network is a valid, non-fraudulent network node, the terminal device may add said network node to said list maintained in the at least one memory.

It should be emphasized that one or multiple of the different criteria described above may be checked by the terminal device in block 504. If multiple different criteria are defined in block 504, only one of them needs to be satisfied in order for the result of the determination in block 504 to be positive.

In response to the radio bearer failing to satisfy at least one of the one or more pre-defined criteria in block 504, the terminal device assumes that the data communication associated with the radio bearer may likely originate from a malicious attacker network node. Consequently, the terminal device performs, in block 505, one or more actions for avoiding further processing and/or decoding of the data communication associated with the radio bearer, similar to as described in connection with block 304 of FIG. 3.

In response to the radio bearer not configured for the SDT procedure satisfying at least one of the one or more pre-defined criteria in block 504, the terminal device enables, in block 506, the radio bearer for the SDT procedure. Alternatively, the terminal device may assume that the radio bearer is configured for the SDT procedure and resume the radio bearer (not shown in FIG. 5).

In some embodiments, in response to the radio bearer not configured for the SDT procedure satisfying at least one of the one or more pre-defined criteria but not the criterion requiring the network node associated with the radio bearer to be known by the terminal device to be a valid, non-fraudulent network node in block 504, the terminal device may determine that the network node is a valid, non-fraudulent network node. Consequently, the terminal device may add the network node to the list of valid, non-fraudulent network nodes.

FIG. 6 illustrates a process according to embodiments for transmitting data on radio bearers not configured for an SDT procedure. The process in FIG. 6 may be performed by an apparatus (e.g., a computing device). Specifically, said apparatus may be a network node or a part thereof or an apparatus communicatively connected to a network node. The network node may be an access node or a distributed unit of a distributed access node such as the element 104 of FIG. 1. In the following, the entity carrying out the process is called a network node for simplicity. The process of FIG. 6 may be carried out prior to the performing of the process of FIG. 5 at the terminal device.

Referring to FIG. 6, it may be initially assumed, similar to FIG. 4, that a terminal device has initiated an SDT procedure with the network node through SDT-specific resources (e.g., RACH resources) or the SDT procedure has been indicated to the network node via other means such as as a part of a resumeCause field in an (initial) uplink message from the terminal device to the network node.

The network node suspends, in block 601, when a terminal device is in an inactive state while an SDT procedure involving the terminal device is ongoing, all data communications to the terminal device over radio bearers not configured for the SDT procedure and further not being the SRB1 or configured with integrity protection. In other words, the similar functionality to block 401 of FIG. 4 is implemented in block 601 though here two exceptions to the suspending of all data communications over non-SDT radio bearer are allowed: SRB1 and integrity protected radio bearers. As described in connection with FIG. 5, the terminal device may be configured to receive data on these types of radio bearers even if they are not configured for the SDT procedure.

In some embodiments, block 601 may be omitted.

Moreover, the network node transmits, in block 602, to the terminal device when the terminal device is in the inactive state while the SDT procedure involving the terminal device is ongoing, a data communication over a radio bearer not configured for the SDT procedure. Here, the radio bearer is specifically either SRB1 or a radio bearer configured with integrity protected. The data communication may comprise or be transmitted along with information (e.g., an LCID or eLCID) that indicates the data communication to the terminal device over the radio bearer.

When the network node obtains data to be sent over the radio bearer not configured for the ongoing SDT procedure (before the transmission of block 602), there may be also one or more other radio bearers not configured with integrity protection with data waiting to be sent to the terminal device. In such a case, the network node may authenticate itself first on at least one of those (earlier) radio bearer(s) before transmitting the more recently obtained data. Thanks to the authentication, the terminal device knows during the later transmission that the network node is a valid, non-fraudulent network node and thus the transmission may be carried using any SDT or non-SDT radio bearer (as described above). This way it is possible to initiate an SDT procedure without configuring any SDT radio bearers beforehand. If the terminal device receives data not configured with integrity protection before authentication of the network node, terminal device may identify the access node as an attacker and initiate the one or more actions as described in connection with FIGS. 3 and 5.

Figures 7, 8:
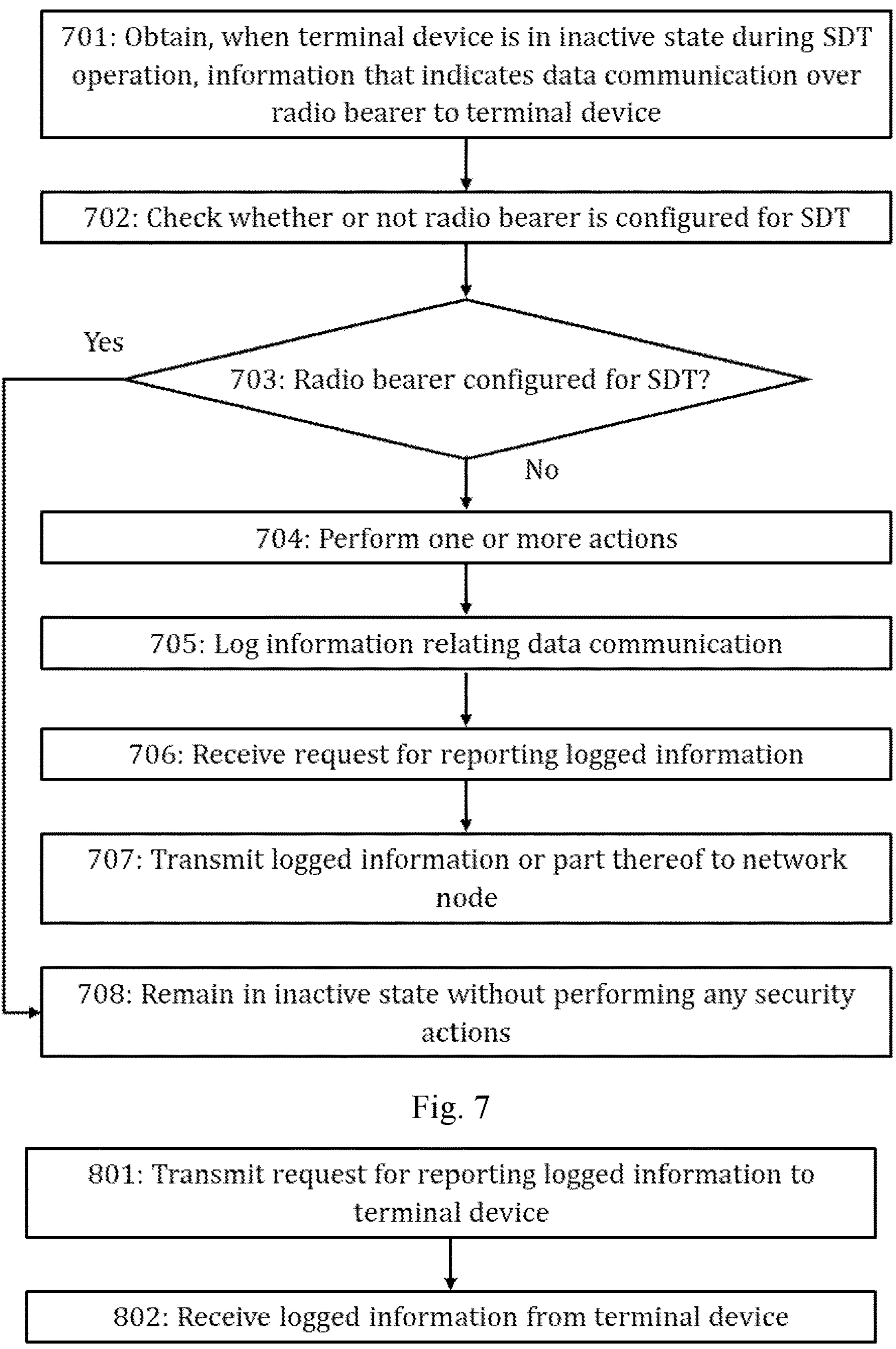

FIG. 7 illustrates another process according to embodiments for avoiding prolonged processing and/or decoding of unwanted data transmissions during the execution of an SDT procedure. The process in FIG. 7 may be performed by an apparatus (e.g., a computing device). Specifically, said apparatus may be a terminal device (e.g., either of terminal devices 100, 102 of FIG. 1) or a part thereof or an apparatus communicatively connected to a terminal device. In the following, the entity carrying out the process is called a terminal device for simplicity.

Referring to FIG. 7, it is initially assumed, similar to as discussed with any of FIGS. 2 to 6, that the terminal device is operating in an inactive state (e.g., the RRC inactive state) and that an SDT procedure (e.g., an MO-SDT procedure and/or an MT-SDT procedure) is ongoing. For example, the terminal device may be executing the SDT procedure in communication with a network node. One or more radio bearers may be configured for use by the terminal device for the SDT procedure.

Similar to block 201 of FIG. 2, the terminal device obtains, in block 701, when the terminal device is in the inactive state while the SDT procedure is ongoing, information that indicates data communication to the terminal device over a radio bearer. The terminal device may also obtain or receive the data communication itself in block 201. In general, the description provided in connection with block 201 of FIG. 2 may apply, mutatis mutandis, also for block 701. Similar to block 202 of FIG. 2, the terminal device checks, in block 702, whether or not the radio bearer is configured for the SDT procedure (based on the information).

In response to the radio bearer not being configured for the SDT procedure in block 703 and optionally failing to satisfy at least one of the one or more pre-defined criteria (not shown in FIG. 7), the terminal device not only performs, in block 704, one or more actions for avoiding further processing and/or decoding of the data communication associated with the radio bearer (similar to previous embodiments such as block 304 of FIG. 3) but also logs, in block 705, information relating to the data communication (or to the network node from which the information was received).

The logged information may comprise, for example, information on the network node from which the information was received (e.g., information on a cell and/or tracking provided by the network node) and/or information on the radio bearer over which the data communication was transmitted. For example, the logged information may comprise at least one of:

a physical cell identifier (PCI),
a new radio cell global identifier (NCGI),
a tracking area identity (TAI),
SRB1, or
the radio bearer.

Here, the PCI, the NCGI and the TAI may be the PCI, the NCGI and the TAI of the (current) cell of the terminal device (i.e., the cell in which the terminal device was located during the obtaining in block 701).

In some embodiments, the relative order between blocks 704, 705 may be reversed.

The terminal device receives, in block 706, a request for reporting logged information related to data communications over any radio bearers not configured for the SDT procedure received while the SDT procedure (or any SDT procedure) is ongoing. The request may request reporting all or at least some of the logged information. In some embodiments, the request may define which type(s) of logged information should be reported.

The terminal device transmits, in block 707, to the network node, at least the logged information (that is, the information logged in block 705) related to the data communication over the radio bearer or a part of the logged information.

In some embodiments, block 706 may be omitted. In such embodiments, the terminal device may be configured to automatically report logged information (or a part thereof) according to block 707, e.g., periodically, regularly, upon logging new information or upon having logged a pre-defined amount of information after the previous reporting instance.

In some embodiments, the terminal device may log and/or report information relating only to data communications which are associated with radio bearers not configured for the SDT procedure and further which do not satisfy at least one of the one or more pre-defined criteria (as discussed in connection with FIG. 5). In other embodiments, at least the logging may be performed for all radio bearers.

FIG. 8 illustrates a process according to embodiments for requesting and receiving information logged by a terminal device. The process in FIG. 8 may be performed by an apparatus (e.g., a computing device). Specifically, said apparatus may be a network node or a part thereof or an apparatus communicatively connected to a network node. The network node may be an access node or a distributed unit of a distributed access node such as the element 104 of FIG. 1. In the following, the entity carrying out the process is called a network node for simplicity.

The process of FIG. 8 may be carried out by the network node when a terminal device carries out the process of FIG. 7 (or in particular processes of blocks 706 to 707). Thus, any of the features and/or definitions described in connection with FIG. 7 (especially regarding the logged information, the request for logged information and reporting of the logged information) may apply, mutatis mutandis, also here.

Referring to FIG. 8, the network node transmits, in block 801, to the terminal device, a request for reporting logged information relating to data communications received over any radio bearers not configured for an SDT procedure involving the terminal device while the SDT procedure is ongoing. The logged information may be defined as discussed in connection with block 705 of FIG. 7.

The network node receives, in block 802, logged information from the terminal device. The logged information relates to one or more data communications transmitted over one or more radio bearers not configured for the SDT procedure. The logged information may comprise all or at least some of the information logged by the terminal device relating to said one or more data communications received over the one or more radio bearers not configured for the SDT procedure.

In some embodiments, block 801 may be omitted. In such embodiments, the terminal device may be configured to automatically report logged information (or a part thereof) according to block 707 of FIG. 7, e.g., periodically, regularly, upon logging new information or upon having logged a pre-defined amount of information after the previous reporting instance.

The actions described in connection with FIGS. 2, 3, 5 and 7 may be implemented, e.g., by a MAC and/or RRC layers of the terminal device. It should be noted that these are merely examples and also PHY (i.e., physical), RLC, PDCP, and/or NAS layers may equally be involved. Moreover, the data communication (being, e.g., a data unit) as described in connection with any of the embodiments may refer to any type of data, including, e.g., PHY layer data, MAC layer data, RRC layer data, RLC layer data, PDCP data or NAS layer.

The blocks, related functions, and information exchanges described above by means of FIGS. 2 to 8 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 9:
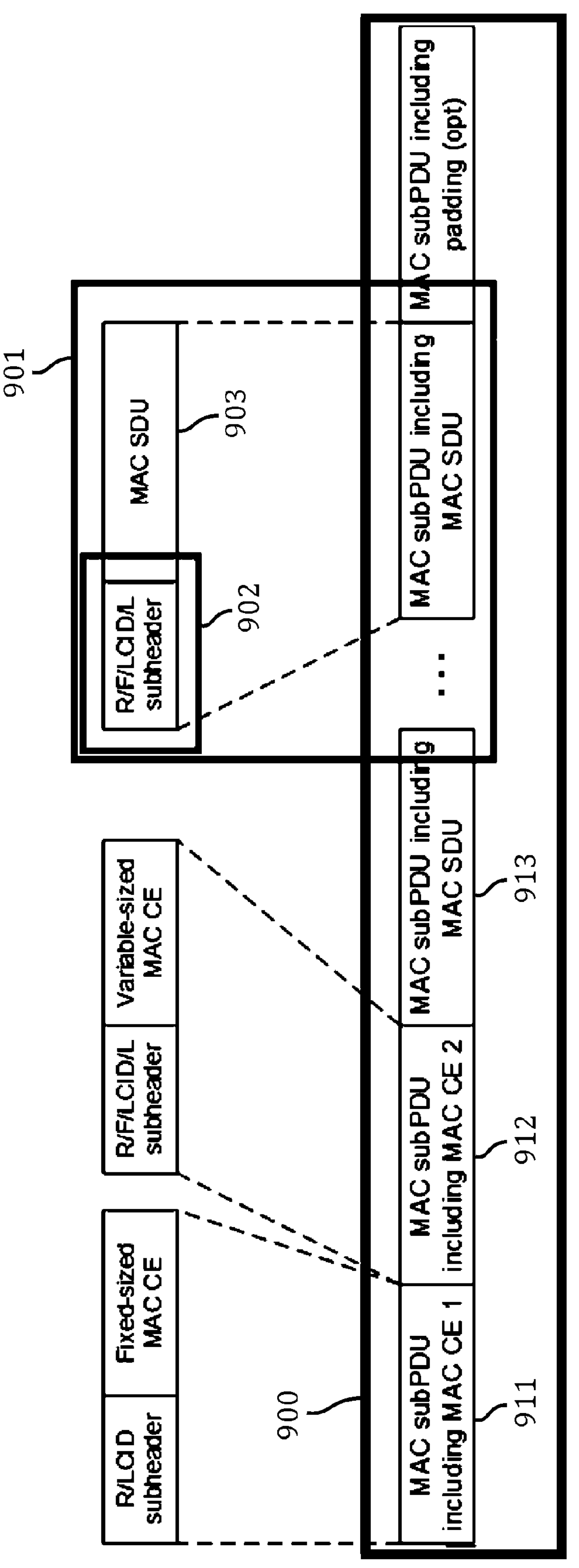
FIG. 9 illustrates an exemplary data transmission receivable by a terminal device in an inactive state while an SDT procedure is ongoing.

FIG. 9 illustrates exemplary data transmission(s) receivable by a terminal device while operating in an inactive state while an SDT procedure ongoing. The data transmission of FIG. 9 may correspond to a data transmission by a valid, non-fraudulent network node or by an attacker network node. In particular, FIG. 9 illustrates a downlink MAC PDU 900 comprising a plurality of consecutive MAC sub-PDUs 901, 911, 912, 913, 914. The MAC PDU 900 may be addressed to a cell radio network temporary identifier (C-RNTI) or a configured scheduling radio network temporary identifier (CS-RNTI) of a MAC entity of the terminal device (comprising an LCID or eLCID). The contents of the MAC sub-PDUs 901, 911, 912, 914 are shown in further detail above the element 900.

The MAC sub-PDU 901 is of particular interest in view of the embodiments. The MAC sub-PDU 901 comprises a MAC subheader 902 and a MAC SDU 903. The MAC subheader 902 and the MAC SDU 903 may correspond, respectively, to the information that indicates data communication to the terminal device over the radio bearer (possibly not configured for the SDT procedure) and the data communication (or the data unit) itself as described in connection with any of FIGS. 2 to 8. The MAC subheader 902 is indicated in FIG. 9 as being a R/F/LCID/L subheader, where "R/F/LCID/L" corresponds to fields which may be included in the header ("R", "F" and "L" standing, respectively, for reserved, format and length). The MAC subheader 902 may comprise at least the LCID field.

Figure 10:
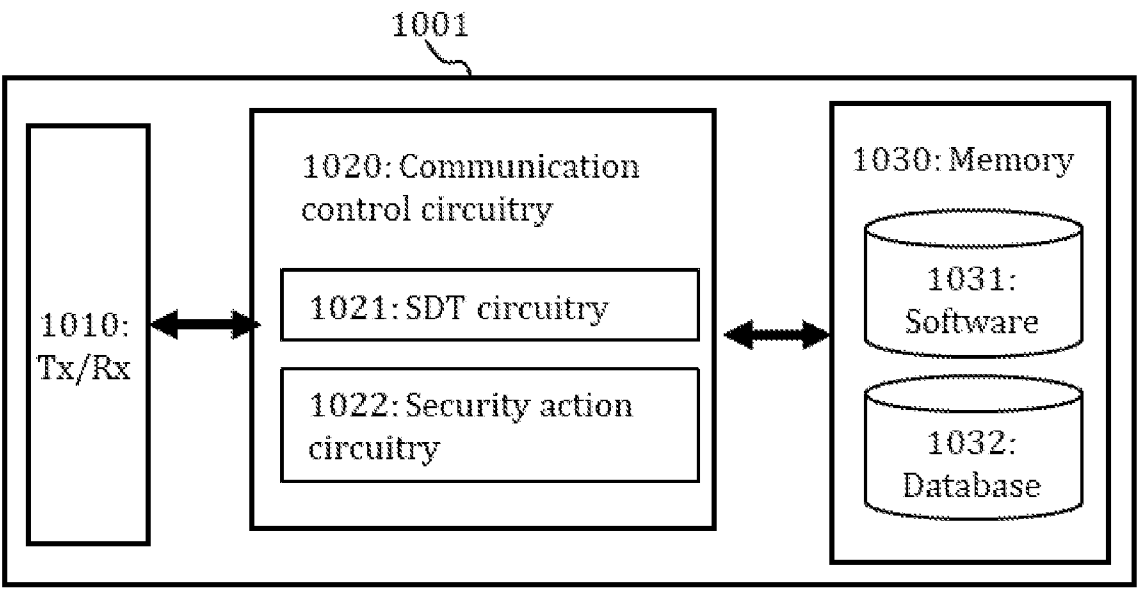
FIGS. 10 and 11 illustrate apparatuses according to embodiments.

FIG. 10 provides an apparatus 1001 according to some embodiments. Specifically, FIG. 10 illustrates an apparatus 1001 configured to carry out at least some of the terminal device-side functionalities according to embodiments described above. The apparatus 1001 may be a terminal device or a part (e.g., a computing device) thereof or an apparatus communicatively connected to a terminal device. The apparatus 1001 may comprise one or more communication control circuitry 1020, such as at least one processor, and at least one memory 1030, including one or more algorithms 1031, such as a computer program code (software) wherein the at least one memory and the computer program code (software) are configured, with the at least one processor, to cause the apparatus to carry out any one of the exemplified terminal device-side functionalities described above.

Referring to FIG. 10, the communication control circuitry 1020 of the apparatus 1001 may comprise at least SDT circuitry 1021 which is configured at least to carry out execute at least one SDT procedure (while in an inactive state). The communication control circuitry 1020 of the apparatus 1001 may further comprise security action circuitry 1022. The security action circuitry 1022 may be configured to carry out functionalities of the terminal device (or associated with the terminal device) described above by means of any of FIGS. 2, 3, 5, 7 and 9 using one or more individual circuitries.

Referring to FIG. 10, the memory 1030 may be implemented using any suitable data storage technology, such as semiconductor based memory devices, flash memory, magnetic memory devices and systems, optical memory devices and systems, fixed memory and removable memory.

Referring to FIG. 10, the apparatus 1001 may further comprise different interfaces 1010 such as one or more communication interfaces (TX/RX) comprising hardware and/or software for realizing communication connectivity over the medium according to one or more communication protocols. The communication interface may provide the apparatus 1001 with communication capabilities to communicate in the cellular communication system and enable communication to one or more terminal devices and/or to different network nodes or elements (e.g., different access nodes), for example. The one or more communication interfaces may comprise standard well-known components such as an amplifier, filter, frequency-converter, (de)modulator, and encoder/decoder circuitries, controlled by the corresponding controlling units, and one or more antennas. The apparatus 1001 may also comprise one or more user interfaces.

Figure 11:
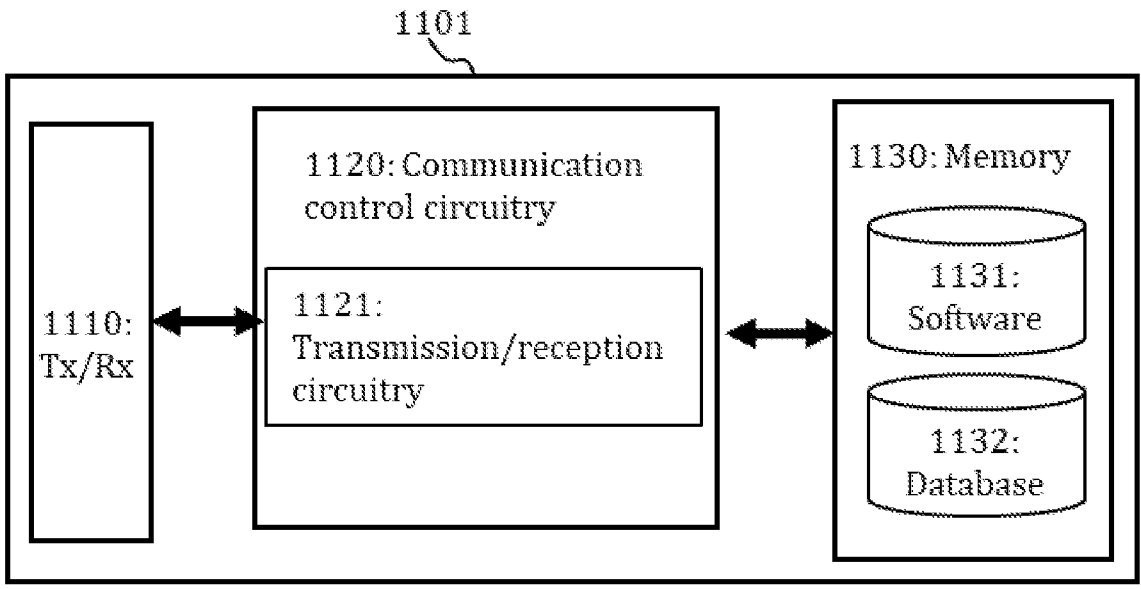

FIG. 11 provides an apparatus 1101 (e.g., a computing device) according to some embodiments. Specifically, FIG. 11 illustrates an apparatus 1101 configured to carry out at least some of the network node-side functionalities according to embodiments described above. The apparatus 1101 may be a network node (e.g., an access node or a distributed unit of a distributed access node) or a part thereof or an apparatus communicatively connected to the network node. The apparatus 1101 may 1101 may comprise one or more communication control circuitry 1120, such as at least one processor, and at least one memory 1130, including one or more algorithms 1131, such as a computer program code (software) wherein the at least one memory and the computer program code (software) are configured, with the at least one processor, to cause the apparatus to carry out any one of the exemplified network node-side functionalities described above.

Referring to FIG. 11, the communication control circuitry 1120 of the apparatus 1101 comprise at least transmission/reception circuitry 1121 which is at least configured at least to enable transmission of data to a terminal device over radio bearers not configured for an SDT procedure while the SDT procedure is ongoing at the terminal device operating in an inactive state. To this end, the transmission/reception circuitry 1121 is configured to carry out functionalities of the network node (or associated with the network) described above by means of FIGS. 4 and/or 6 using one or more individual circuitries.

Referring to FIG. 11, the memory 1130 may be implemented using any suitable data storage technology, such as semiconductor based memory devices, flash memory, magnetic memory devices and systems, optical memory devices and systems, fixed memory and removable memory.

Referring to FIG. 11, the apparatus 1101 may further comprise different interfaces 1110 such as one or more communication interfaces (TX/RX) comprising hardware and/or software for realizing communication connectivity over the medium according to one or more communication protocols. The communication interface may provide the apparatus 1101 with communication capabilities to communicate in the cellular communication system and enable communication to one or more terminal devices and/or one or more other network nodes or elements, for example. The one or more communication interfaces may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node or an LMF, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2 to 8 may be carried out by an apparatus (e.g., a computing device for a terminal device, a terminal device, a computing device for a network node or a network node) comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 8 or operations thereof.

According to an aspect, there is provided an apparatus (e.g., an apparatus for a terminal device or a terminal device) comprising means for performing:

obtaining, when the terminal device is in an inactive state while a small data transmission, SDT, procedure is ongoing, information that indicates a data communication over a radio bearer to the terminal device;

checking whether or not the radio bearer is configured for the SDT procedure; and determining whether or not to avoid further processing and/or decoding of the data communication based at least on the checking.

According to an aspect, there is provided an apparatus (e.g., an apparatus for network node or a network node) comprising means for performing:

suspending all data communications to a terminal device over any radio bearer not configured for an SDT procedure when the terminal device is in an inactive state while the SDT procedure involving the terminal device is ongoing; or transmitting, to the terminal device when the terminal device is in the inactive state while the SDT procedure involving the terminal device is ongoing, a data communication over a radio bearer not configured for the SDT procedure, wherein the radio bearer is SRB1 or a radio bearer configured with integrity protection.

In embodiments, the at least one processor, the memory, and the computer program code form processing means or comprises one or more computer program code portions for carrying out one or more operations according to any one of the embodiments of FIGS. 2 to 8 or operations thereof.

Embodiments as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may but are not required to, be combined with other embodiments in various ways.

The invention claimed is:

1. A terminal device, comprising:

at least one processor; and at least one memory storing instructions that, when executed by the at least one processor, cause the terminal device at least to perform:

obtaining, when the terminal device is in an inactive state while a small data transmission (SDT) procedure is ongoing, information that indicates transmission of a data unit over a radio bearer to the terminal device;

determining that the radio bearer is not configured for the SDT procedure;

determining to avoid further processing, decoding, or processing and decoding of the data unit based at least on the determining the radio bearer is not configured for the SDT procedure; and performing one or more actions for avoiding the further processing, decoding, or processing and decoding of the data unit associated with the radio bearer, the one or more actions comprising discarding the data unit.

2. The terminal device of claim 1, wherein the one or more actions comprise at least: transitioning from the inactive state to an idle state.

3. The terminal device of claim 1, wherein the at least one memory stores instructions that when executed by the at least one processor cause the terminal device to obtain the data unit.

4. The terminal device of claim 3, wherein the one or more actions comprise at least one of:

storing the data unit in a buffer;

storing the data unit in the buffer and flushing the data unit stored in the buffer; or suspending sending of the data unit to an upper layer.

5. The terminal device of claim 1, wherein the at least one memory stores instructions that when executed by the at least one processor cause the terminal device to perform:

determining that the further processing, decoding, or decoding and processing of the data unit is not to be avoided, remaining in the inactive state without performing any of the one or more actions for avoiding the further processing, decoding, or processing and decoding of the data unit associated with the radio bearer.

6. The terminal device of claim 1, wherein the at least one memory stores instructions that, when executed by the at least one processor, cause the terminal device to perform:

based on determining the radio bearer is configured for the SDT procedure, determining that the further processing, decoding, or processing and decoding of the data unit is not to be avoided.

7. The terminal device of claim 1, wherein the at least one memory stores instructions that when executed by the at least one processor cause the terminal device to perform:

based on the determining that the further processing, decoding, or decoding and processing of the data unit is to be avoided, logging information related to the data unit, wherein the logged information comprises at least one of:

physical cell identifier;

new radio cell global identifier;

tracking area identity;

SRB1; or the radio bearer.

8. The terminal device of claim 7, wherein the at least one memory stores instructions that when executed by the at least one processor cause the terminal device to perform:

receiving, from a network node, a request for reporting all or at least some of the logged information related to data units received over radio bearers not configured for the SDT procedure while the SDT procedure is ongoing; and in response to the determining the radio bearer is not configured for the SDT procedure, transmitting, to the network node, at least the logged information related to the data unit over the radio bearer or a part thereof.

9. The terminal device of claim 1, wherein the data unit comprises at least one of: a medium access control (MAC) protocol data unit, or a MAC service data unit.

10. The terminal device of claim 1, wherein the information that indicates the transmission of the data unit comprises a logical channel identifier (LCID), or an extended LCID.

11. The terminal device of claim 1, wherein the SDT procedure comprises at least one of a mobile-originated small data transmission, or a mobile-terminated small data transmission.

12. The terminal device of claim 1, wherein the at least one memory stores instructions that, when executed by the at least one processor, cause the terminal device to perform at least the following:

determining the radio bearer is not configured for the SDT procedure and also fails to satisfy any of one or more pre-defined criteria, and therefore determining that the further processing, decoding, or decoding of the data unit is to be avoided; or determining the radio bearer is not configured for the SDT procedure but satisfies at least one of the one or more pre-defined criteria, and therefore determining that the further processing, decoding, or processing and decoding of the data unit is not to be avoided.

13. The terminal device of claim 12, wherein the one or more pre-defined criteria comprise one of the following:

a criterion requiring the radio bearer to be a signaling radio bearer 1 (SRB1);

a criterion requiring the radio bearer to be a radio bearer configured with integrity protection; or a criterion requiring a network node associated with the radio bearer to be known by the terminal device to be a valid, non-fraudulent network node.

14. The terminal device of claim 13, wherein the at least one memory stores instructions that, when executed by the at least one processor, cause the terminal device to perform:

determining that the network node is a valid, non-fraudulent network node in response to the radio bearer associated with the network node being SRB1 or the radio bearer associated with the network node being integrity protected.

15. The terminal device of claim 1, wherein the data unit comprises a medium access control (MAC) protocol data unit, and the information that indicates the transmission of the data unit comprises a logical channel identifier (LCID) or an extended LCID.

16. A method, comprising:

obtaining, when a terminal device is in an inactive state while a small data transmission (SDT) procedure is ongoing, information that indicates transmission of a data unit over a radio bearer to the terminal device;

determining the radio bearer is not configured for the SDT procedure;

determining to avoid further processing, decoding, or processing and encoding of the data unit based at least on the determining the radio bearer is not configured for the SDT procedure; and performing one or more actions for avoiding the further processing, decoding, or processing and decoding of the data unit associated with the radio bearer, the one or more actions comprising discarding the data unit.

17. A network node, comprising:

at least one processor; and at least one memory storing instructions that, when executed by the at least one processor, cause the network node at least to perform:

transmitting, to a terminal device when the terminal device is in an inactive state while a small data transmission (SDT) procedure involving the terminal device is ongoing, information that indicates transmission of a data unit over a radio bearer to the terminal device, wherein the information is used by the terminal device to determine that the radio bearer is not configured for the SDT procedure, and to perform one or more actions for avoiding further processing, decoding, or processing and decoding of the data unit associated with the radio bearer, the one or more actions comprising discarding the data unit.

18. The network node of claim 17, wherein the at least one memory stores instructions that when executed by the at least one processor cause the network node further to perform:

wherein the information comprises a logical channel identifier (LCID), or an extended LCID.

* * * * *